US007679876B2

(12) United States Patent
Ong et al.

(10) Patent No.: US 7,679,876 B2
(45) Date of Patent: Mar. 16, 2010

(54) CURRENT LIMITER SYSTEM, CIRCUIT AND METHOD FOR LIMITING CURRENT

(75) Inventors: Beng Hwee Ong, Singapore (SG); Wee Liang Lien, Singapore (SG); Min Jie Wu, Singapore (SG); Chang-Fu Kuo, Hsinchu (TW)

(73) Assignee: Mediatek Singapore Pte Ltd., Ayer Rajah Crescent (SG)

( * ) Notice: Subject to any disclaimer, the term of this patent is extended or adjusted under 35 U.S.C. 154(b) by 473 days.

(21) Appl. No.: 11/687,690

(22) Filed: Mar. 19, 2007

(65) Prior Publication Data

US 2007/0268643 A1 Nov. 22, 2007

Related U.S. Application Data

(60) Provisional application No. 60/747,821, filed on May 22, 2006.

(51) Int. Cl.
*H02H 9/08* (2006.01)

(52) U.S. Cl. ..................................................... 361/93.9

(58) Field of Classification Search ................. 361/93.9
See application file for complete search history.

(56) References Cited

U.S. PATENT DOCUMENTS

| | | | | |
|---|---|---|---|---|
| 4,701,675 | A * | 10/1987 | Masaki | 315/310 |
| 5,448,039 | A * | 9/1995 | Okayama et al. | 219/646 |
| 5,793,596 | A * | 8/1998 | Jordan et al. | 361/98 |
| 6,246,555 | B1 * | 6/2001 | Tham | 361/18 |
| 6,697,241 | B1 * | 2/2004 | Smith | 361/91.1 |
| 6,804,102 | B2 | 10/2004 | Hamon et al. | |
| 2004/0090726 | A1 * | 5/2004 | Ball | 361/93.9 |
| 2007/0223164 | A1 | 9/2007 | Oki et al. | |

FOREIGN PATENT DOCUMENTS

JP 2005323413 11/2005

OTHER PUBLICATIONS

CN Office Action mailed Oct. 17, 2008.
English Abstract of JP2005323413.

* cited by examiner

*Primary Examiner*—Robert DeBeradinis
*Assistant Examiner*—Scott Bauer
(74) *Attorney, Agent, or Firm*—Thomas, Kayden, Horstemeyer & Risley

(57) ABSTRACT

A system capable of limiting a current through a load and a method thereof. The system comprises a current sensor, a determination circuit, and a current mirror circuit. The current sensor, coupled to the load, produces a current indication indicating the current. The determination circuit, coupled to the current sensor, generates a short-circuit signal when the current exceeds a predetermined threshold. The current mirror circuit, coupled to a voltage source, the current sensor and the determination circuit, comprises a current mirror and a bypass path, delivers a mirrored current from the current mirror to the load upon receiving the short-circuit signal, and passes the current from the voltage source through the bypass path to the load in the absence of the short-circuit signal.

18 Claims, 8 Drawing Sheets

CURRENT LIMITER SYSTEM, CIRCUIT AND METHOD FOR LIMITING CURRENT

BACKGROUND OF THE INVENTION

1. Field of the Invention

The invention relates to electronic circuits, and in particular to a current limiter and a method thereof.

2. Description of the Related Art

Current limiters, connected to a load of an electric circuit, limit the current thereto under abnormal situations, such as short-circuit, to prevent the electronic circuit from being damaged by excessive current therethrough.

U.S. Pat. No. 6,804,102 B2 discloses a conventional voltage regulator limiting the current providing to a load to a first threshold current by comparing an input voltage of the load with a threshold voltage. FIG. 8 shows a relationship of output voltage $V_{out}$ with respect to supply voltage $V_{SC}$ for the conventional voltage regulator and a desirable current limiter. A curve 80 represents the supply voltage—output voltage relationship of the voltage regulator, where the range of output voltage $V_{out}$ is restricted by the threshold voltage. A curve 82 indicates the desirable current limiter with increasing output voltage $V_{out}$ as supply voltage $V_{SC}$ increases. There exist a need for a current limiter and a method to provide current limiting capability without input voltage restriction.

BRIEF SUMMARY OF THE INVENTION

A detailed description is given in the following embodiments with reference to the accompanying drawings.

According to the invention, a system capable of limiting a current through a load comprises a current sensor, a determination circuit, and a current supply circuit. The current sensor, coupled to the load, produces a current indication of the current. The determination circuit, coupled to the current sensor, generates a short-circuit signal when the current exceeds a predetermined threshold. The current supply circuit, coupled to a voltage supply, the current sensor and the determination circuit, comprises a current limiting path and a current pass-though path, delivering a limited current though the current mirror to the load upon receiving the short-circuit signal, and passes the current from the voltage supply through the pass-through path to the load in the absence of the short-circuit signal.

According to another embodiment of the invention, an integrated circuit comprises a determination circuit and a current supply circuit. The determination circuit receives a current indication indicating current flowing through a load to generate a short-circuit signal when the current exceeds a predetermined threshold. The current supply circuit, coupled to a voltage source and the determination circuit, comprising a current limiting path and a current pass-though path, delivers a mirrored current from the voltage supply to the load upon receiving the short-circuit signal, and passes the current from the voltage supply through the pass-through path to the load in the absence of the short-circuit signal.

According to yet another embodiment of the invention, a method of limiting a current through a load, comprises providing a current indication indicating the current, generating a short-circuit signal when the current exceeds a predetermined threshold, delivering a limited current through a current mirror in a current supply circuit to the load upon reception of the short-circuit signal, and passing the current from the voltage supply through a pass-through path in the current supply circuit to the load in the absence of the short-circuit signal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
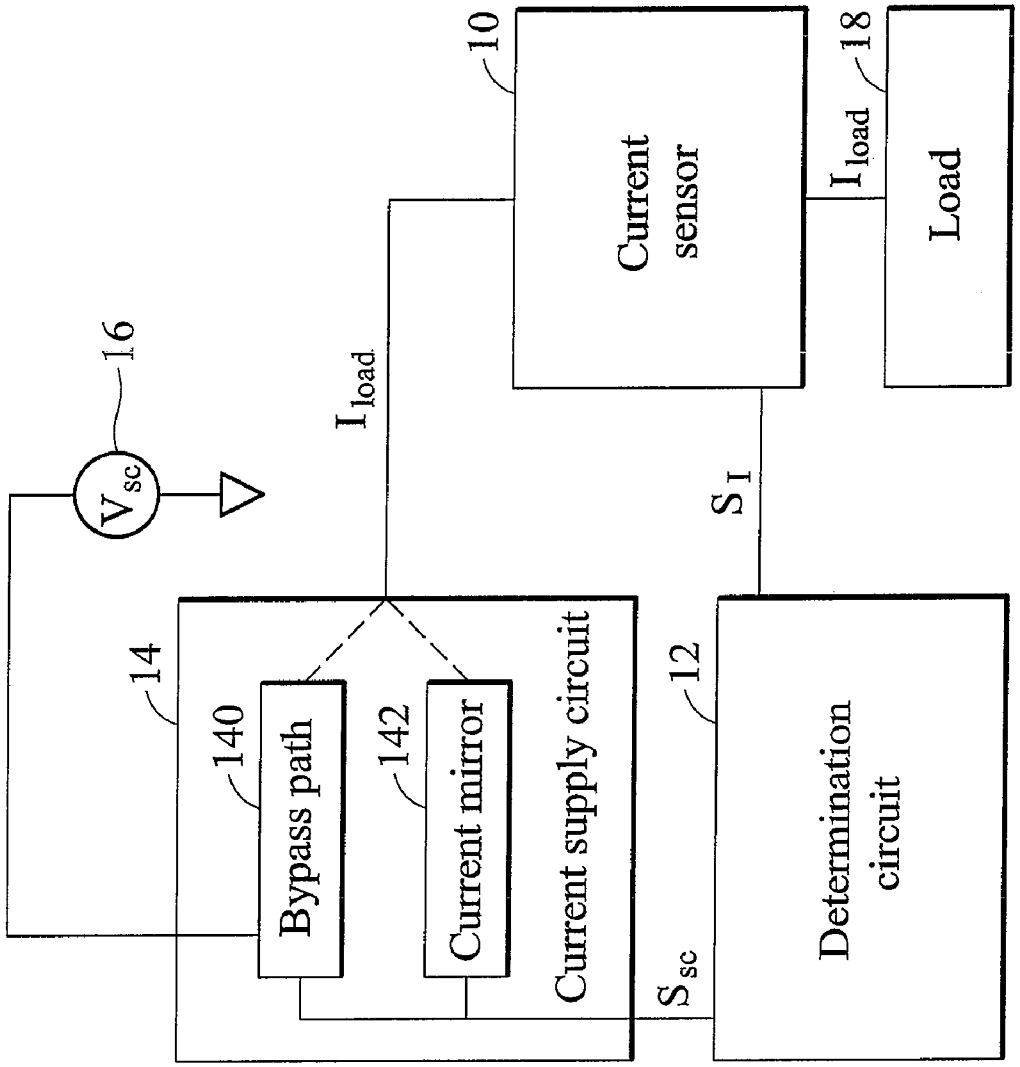
FIG. 1 is a block diagram of an exemplary current limiter according to the present invention.

FIG. 1 is a block diagram of an exemplary current limiter according to the present invention. The current limiter includes a current sensor 10, a determination circuit 12, a current supply circuit 14, a voltage supply source 16, and a load 18. The current sensor 10 is coupled to the load 18, the current supply circuit 14, and the determination circuit 12. Furthermore, the determination circuit 12 is coupled to the current supply circuit 14 and the voltage supply 16.

In one embodiment, the current supply circuit 14 and the determination circuit 12 are located in an integrated circuit (IC), and the current sensor 10, the voltage source 16 and the load 18 are external to the IC. In another embodiment, the current supply circuit 14, the determination circuit 12 and the current sensor 10 are in an IC, and the voltage source 16 and the load 18 are external to the IC. The load 18 is in series with the current sensor 10, and may include resistive, capacitive, or inductive electronic components, or any combination, drawing a current $I_{load}$ from the voltage source 16 under a normal operation. During occurrence of a short circuit, the current supply circuit 14 limits the current $I_{load}$ into the load 18 below a predetermined threshold current $I_{lim}$, for preventing the IC and the load 18 from being damaged by a short circuit current. The current sensor 10 produces a current indication signal $S_I$ indicating the current $I_{load}$. In an embodiment, the current sensor 10 is a resistor, and the current indication signal $S_I$ includes voltages across two ends thereof.

The determination circuit 12 receives the current indication signal $S_I$ from the current sensor 10, and generates a short circuit signal $S_{SC}$ or an inversed short-circuit signal $S_{NSC}$. When the current $I_{load}$ exceeds the predetermined threshold current $I_{lim}$, the determination circuit 12 generates the short circuit signal $S_{SC}$. When current $I_{load}$ is within predetermined threshold current $I_{lim}$, the determination circuit 12 generates the inversed short-circuit signal $S_{NSC}$. Upon detection of the current $I_{load}$ exceeding the predetermined threshold current $I_{lim}$, the determination circuit 12 determines that the current $I_{load}$ is too high, and a short circuit condition might be present, and correspondingly generates the short-circuit signal $S_{SC}$ indicating the short-circuit condition.

The current supply circuit 14 includes a current pass-through path 140 coupled to the voltage supply source 16, and a current limiting path 142. The current supply circuit 14 selects a current path between the pass-though path 140 and the current limiting path 142 for supplying the current $I_{load}$ based on the short circuit signal $S_{SC}$. Under a normal condition, the current supply circuit 14 selects the pass-through path 140 and passes the current $I_{load}$ from the voltage source 16 to the load 18 in the absence of the short-circuit signal $S_{SC}$. Under a short-circuit condition, the current supply circuit 14 selects the current limiting path 142 and delivers a limited current $I_{d1}$ of the current $I_{load}$ to the load 18 upon a reception of the short-circuit signal $S_{SC}$. The current limiting path 142 may be a current mirror.

Figure 2:
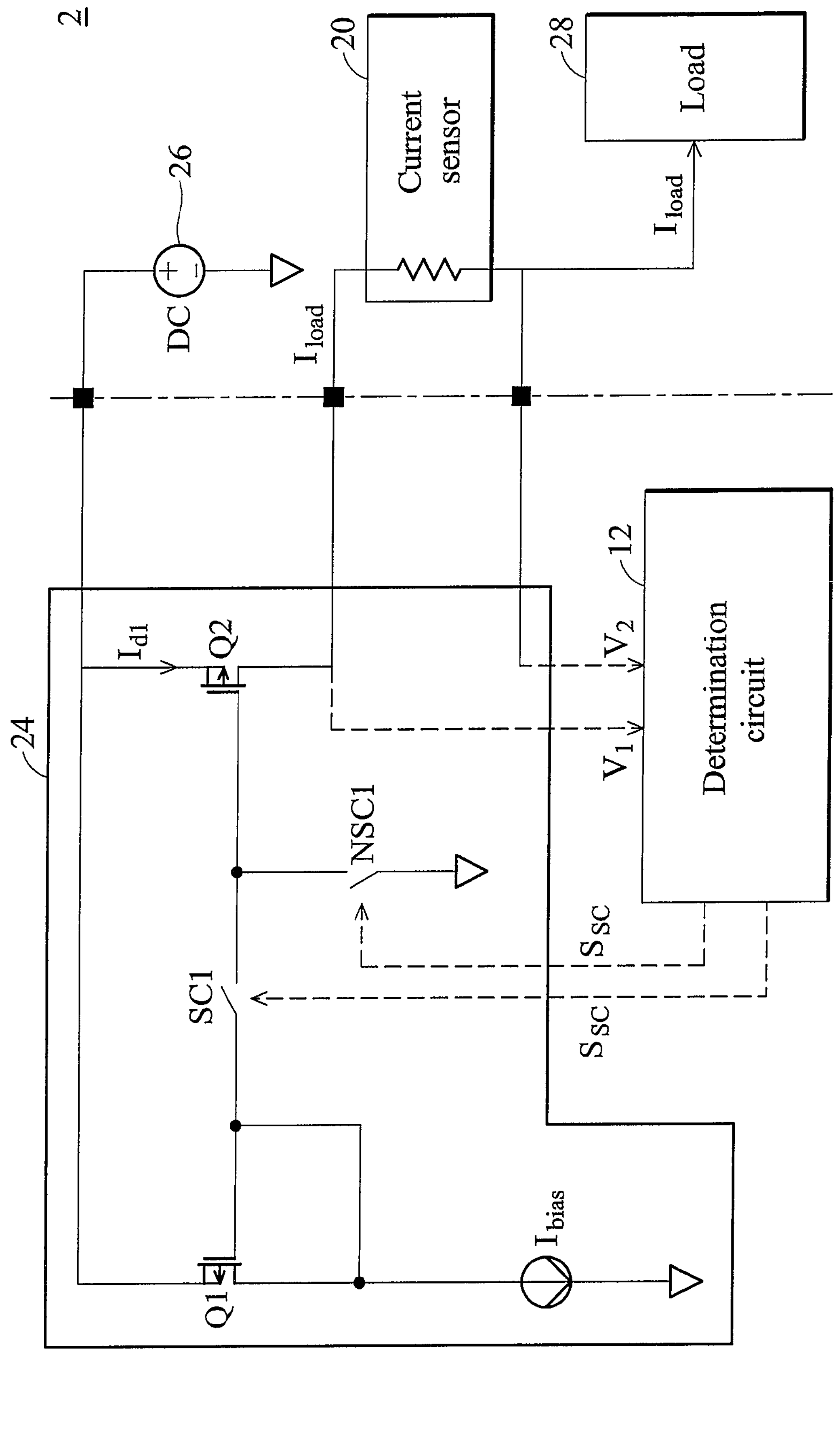
FIG. 2 is a schematic diagram of one implementation of the current limiter in FIG. 1.

FIG. 2 is a schematic diagram of an implementation of the current limiter of FIG. 1. The current limiter 2 includes a current sensor 20, a determination circuit 12, a current supply circuit 24, a voltage source 26, and a load 28. The current sensor 20 is coupled to the load 28, the current supply circuit 24, and the determination circuit 12. The determination circuit 12 in turn is coupled to the current supply circuit 24 and the voltage source 26.

In an embodiment, the current sensor 20 is a resistor producing voltages $V_1$ and $V_2$ at two ends thereof. The determination circuit 12 receives the voltages $V_1$ and $V_2$, and determines whether a current $I_{load}$ exceeds a predetermined threshold current $I_{lim}$ based thereon. If so, the determination circuit 12 generates a short-circuit signal $S_{SC}$ indicating a presence of a short-circuit condition, and if not, the determination circuit 12 generates an inversed short-circuit signal $S_{NSC}$ indicating the current $I_{load}$ being under a normal operation.

The current supply circuit 24 includes a current source $I_{bias}$, a first transistor Q1, a second transistor Q2, a first switch SC1, and a second switch NSC1. The current source $I_{bias}$ is coupled to the first transistor Q1 and the first switch SC1, and then to the second transistor Q2 and then second switch NSC1. As shown in FIG. 1, the pass-though path 140 of the current limiter may be implemented by the second transistor Q2 and the second switch NSC1, and the current limiting path 142 of the current limiter may be implemented by the current source $I_{bias}$, the first transistor Q1, the second transistor Q2, and the first switch SC1.

When the first switch SC1 is opened and the second switch NSC1 is closed, the second transistor Q2 is disconnected from the first transistor Q1, and is turned fully on by connecting a gate thereof to a ground, thereby forming the current pass-through path 140. When the first switch SC1 is closed and the second switch NSC1 is opened, the second transistor Q2 is connected to the first transistor Q1 in current mirror structure, forming the current limiting path 142 thereby.

Under a normal condition, the first switch SC1 is opened, and the second switch NSC1 is closed in the absence of short-circuit signal $S_{SC}$, and then, the second transistor Q2 is disconnected from first transistor Q1, breaking the interconnection of the current mirror and forming the pass-through path 140 that passes the current $I_{load}$ from the voltage source 16 to the load 18.

Under abnormal short-circuit condition, the first switch SC1 is closed, and the second switch NSC1 is opened by the short circuit signal $S_{SC}$, disconnecting the second transistor Q2 from the ground. Further, the interconnection between transistors Q1 and Q2 is completed to form the current mirror 142 and generate a mirrored current $I_{d1}$ to the load 18. Since the mirrored current $I_{d1}$ is only determined by a width to a length (W/L) ratio of the first and second transistors Q1 and Q2, the mirrored current $I_{d1}$ is a constant regardless of the load. Therefore, the current $I_{load}$ is limited to the mirrored current $I_{d1}$.

Figure 3:
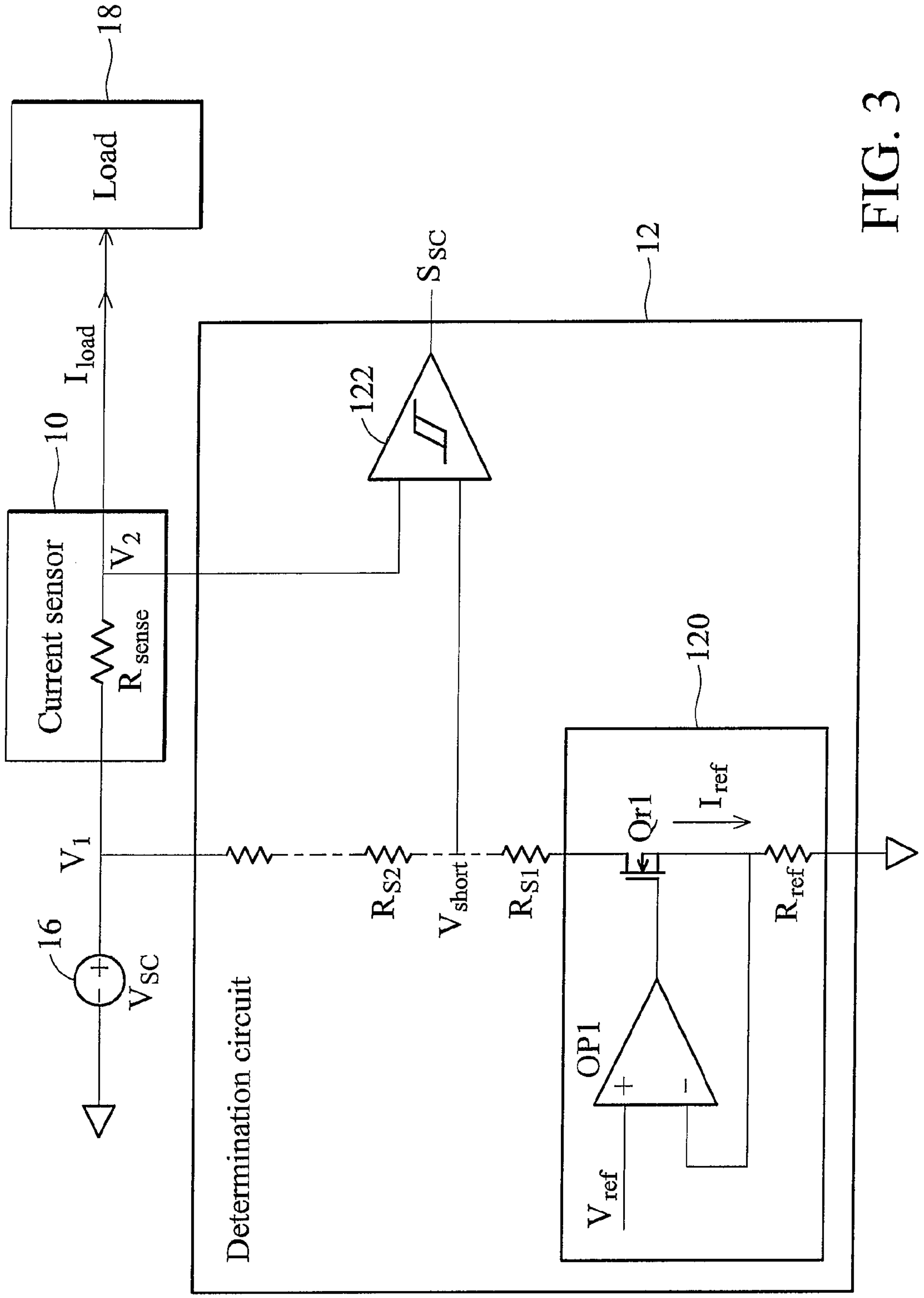
FIG. 3 is a schematic diagram of a determination circuit in FIG. 1.

FIG. 3 shows one exemplary circuit of the determination circuit 12 in FIG. 1. The determination circuit 12 includes a reference current generator 120, a series resistor $R_{Short}$, and a short circuit comparator 122. The reference current generator 120 is coupled to the resistor $R_{Short}$ and the short-circuit comparator 122.

The reference current generator 120 includes an operational amplifier OP1, a transistor Qr1, and a reference resistor $R_{ref}$. The operational amplifier OP1, the transistor Qr1, and the reference resistor $R_{ref}$ are connected in a loop. The operational amplifier OP1 has one non-inverting input coupled to a reference voltage $V_{ref}$, and the other inverting input coupled between the reference resistor $R_{ref}$ and a source of the transistor Qr1, and an output coupled to the gate of the transistor Qr1. $I_{ref}$ is equal to $V_{ref}$ divided by $R_{ref}$, and because the voltage $V_{ref}$ is substantially a constant, the reference current generator 120 substantially generates a constant reference current $I_{ref}$ irrespective of the so-called PVT (process, voltage, and temperature) variation.

Based on the constant reference current $I_{ref}$, the series resistor $R_{Short}$ is able to establish a short circuit threshold voltage $V_{short}$ that is relative to $V_1$ by $I_{ref}R_{Short}$ drop. The voltage $V_2$ between the current sensor 10 and the load 18, is also relative to V1 by $I_{load}R_{Sense}$ drop. The short circuit comparator 122 receives and compares the voltage $V_2$ with the short circuit threshold voltage $V_{short}$ to determine whether the current $I_{load}$ exceeds the predetermined threshold current $I_{lim}$. Because the both voltages V2 and $V_{Short}$ track with V1 that is the voltage supply with an IR drop, value of the resistor $R_{Short}$ is selected such that when the current $I_{load}$ exceeds the predetermined threshold current $I_{lim}$, the voltage $V_2$ exceeds the short circuit threshold voltage $V_{short}$. The fact that the voltage V2 that is the real supply to the load is closely tracked to V1 also gives an advantage so that the real load supply is not limited to a fixed number. The short circuit comparator 122 may be a Schmitt trigger. When the voltage $V_2$ exceeds the short circuit threshold voltage $V_{short}$, the short circuit comparator 122 generates a short circuit signal $S_{SC}$ indicating a short circuit condition. When the voltage $V_2$ is less than a second threshold voltage below the short circuit threshold voltage $V_{short}$, the short circuit comparator 122 stops the short circuit signal $S_{SC}$.

Figure 4:
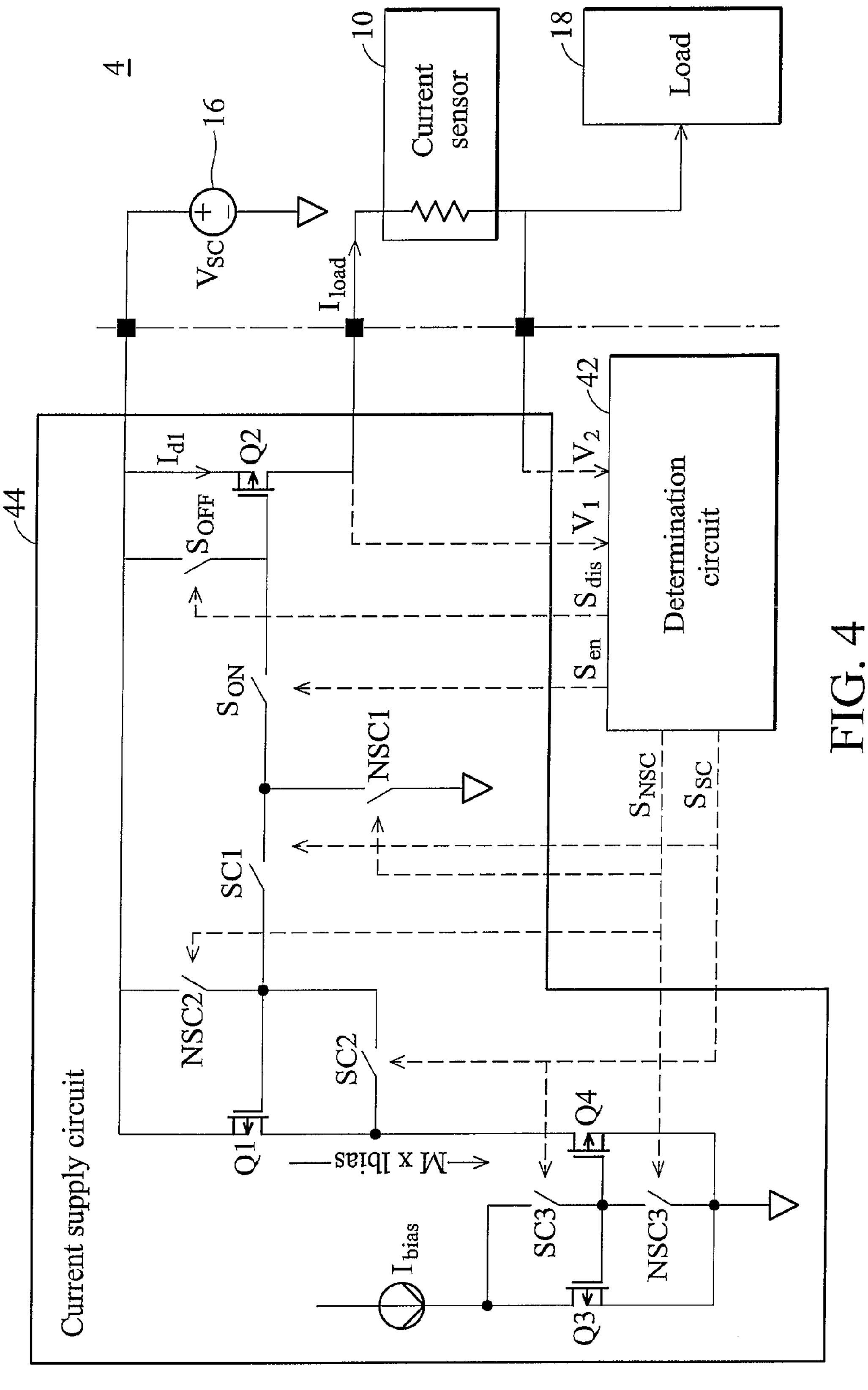
FIG. 4 is a schematic diagram of another implementation of the circuit limiter in FIG. 1.

It is useful to generate a "Normal Function" indicator for Load other than the short circuit protection. In this case, a simple add-on to the circuit in FIG. 4 is able to achieve this. The $R_{Short}$ is made up with a few resistors in series $R_{OK1}$, $R_{OK2}$, . . . , $R_{Short}$, and voltages $V_{OK1}$, $V_{OK2}$, . . . , $V_{Short}$ are generated relative to the supply V1. Comparators are used to compare V2 with these reference voltage to indicate the Load current consumption range. While the Load current is within normal condition, a "Normal Function" indicator is produced.

FIG. 4 is a schematic diagram of another implementation of the circuit limiter in FIG. 1. The circuit limiter 4 includes a current sensor 10, a determination circuit 42, a current supply circuit 44, a voltage supply source 16, and a load 18. The current sensor 10 is coupled to the load 18, the current supply circuit 44, and the determination circuit 42. The determination circuit 42 in turn is coupled to the current supply circuit 44 and the voltage source 16.

The current sensor 10, the voltage supply source 16, and the load 18 as shown in FIG. 4 are identical to corresponding components in the circuit limiter of FIG. 1. The determination circuit 42 may further produce a disable signal $S_{dis}$ for disabling the current supply circuit 44 and an enable signal $S_{en}$ for enabling the current supply circuit 44. These two signals can be just a buffered inverting and non-inverting circuit enabling signal.

In addition to all components in the current supply circuit 24 in FIG. 2, the current supply circuit 44 further includes a first disable switch $S_{ON}$, a second disable switch $S_{OFF}$, third and fourth switches SC2 and NSC2, third and fourth transistors Q3 and Q4, and corresponding fifth and sixth switches SC3 and NSC3.

The first disable switch $S_{ON}$ and the second disable switch $S_{OFF}$ provide a disable function for disabling a current provision to the load 18. When the current supply circuit 44 receives the disable signal $S_{dis}$ from the determination circuit 42, the first disable switch $S_{ON}$ is opened, and the second disable switch $S_{OFF}$ is closed, such that the second transistor Q2 is disconnected from the first transistor Q1, and a gate of the second transistor Q2 is connected to a source thereof. Consequently, the second transistor Q2 is isolated from the first transistor Q1 in the current mirror 142, and is turned off by a zero gate-source voltage, thereby turning off current supplying functionality. In the absence of the disable signal $S_{dis}$ and presence of the enable signal $S_{en}$, the first disable switch $S_{ON}$ is closed, and the second disable switch $S_{OFF}$ is opened, such that the current supply circuit 44 operates as a current supply circuit 24, being capable of a current provision to the load 18.

The third and fourth switches SC2 and NSC2 are controlled by a short circuit signal $S_{SC}$ and an inversed short circuit signal $S_{NSC}$, and provide a power saving capability to the first transistor Q1. The third and fourth transistors Q3 and Q4 form an additional current mirror in addition to the current mirror 142 formed by the first and second transistors Q1 and Q2. The fifth and sixth switches SC3 and NSC3 are also controlled by the short circuit signal $S_{SC}$ and the inversed short circuit signal $S_{NSC}$, and provide a power saving capability to the third and fourth transistors Q3 and Q4.

Figure 5:
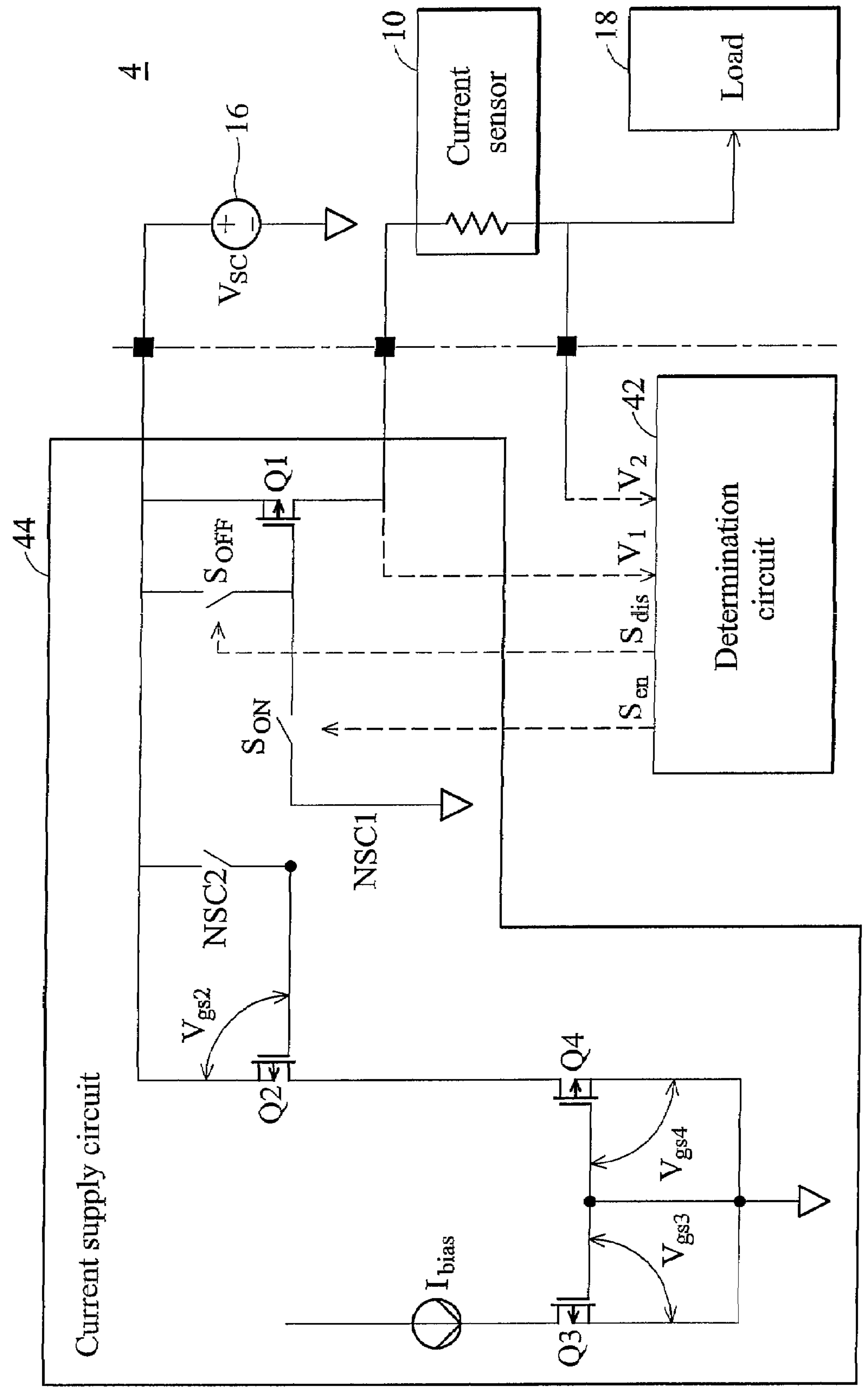
FIG. 5 is a simplified circuit diagram of the current limiter in FIG. 4 under a normal operation.

FIG. 5 is a simplified circuit diagram of the current limiter 4 in FIG. 4 under a normal operation. Referring to FIG. 4, when the current limiter 4 is under a normal operation, the first disable switch $S_{ON}$ is closed and the second disable switch $S_{OFF}$ is opened, the first switch SC1 is opened and the second switch NSC1 is closed, the third switch SC2 is opened and the fourth switch NSC2 is closed, and the fifth switch SC3 is opened and the sixth switch NSC3 is closed, resulting in the circuit configuration of FIG. 5.

Referring now to FIG. 5, since the first transistor Q1 is isolated from the second transistor Q2, the current mirror 142 is broken, and the current $I_{load}$ is supplied via the first transistor Q1 to the load 18. Gate-source voltages $V_{gs2}$, $V_{gs3}$, $V_{gs4}$ corresponding to the second, third and fourth transistors Q2, Q3, and Q4 are zero, such that the second, third and fourth transistors Q2, Q3, and Q4 are turned off all together, and then a power consumption during the normal operation is reduced.

Figure 6:
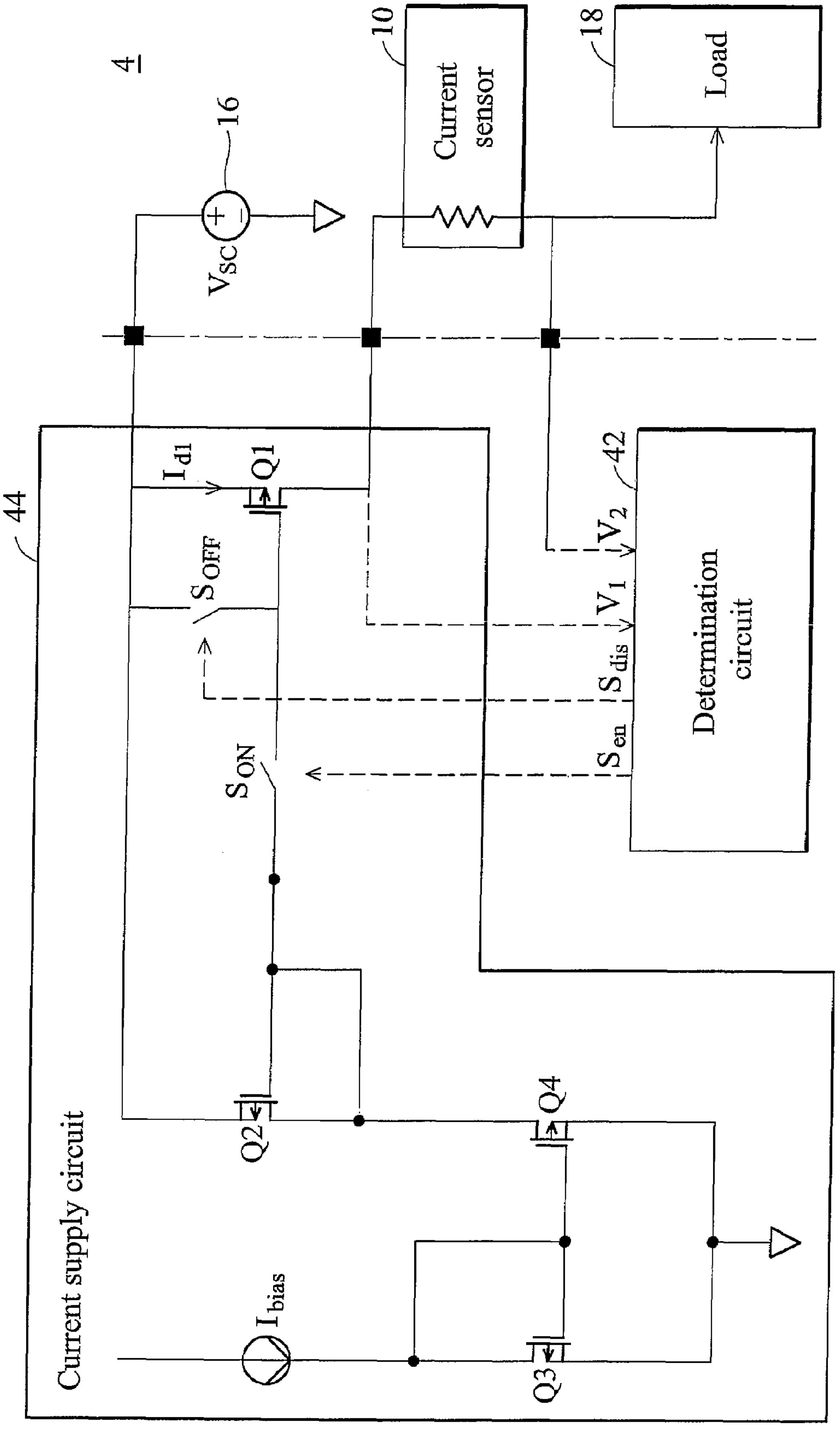
FIG. 6 is a simplified circuit diagram of the current limiter in FIG. 4 during short-circuit.

FIG. 6 is a simplified circuit diagram of the current limiter 4 in FIG. 4 during short-circuit. Referring to FIG. 4, when the current limiter 4 is during short-circuit, the first disable switch $S_{ON}$ is closed and the second disable switch $S_{OFF}$ is opened, the first switch SC1 is closed and the second switch NSC1 is opened, the third switch SC2 is closed and the fourth switch NSC2 is opened, and the fifth switch SC3 is closed and the sixth switch NSC3 is opened, resulting in the circuit configuration of FIG. 6.

Referring to FIG. 6, since the first transistor Q1 is connected to the second transistor Q2, the current mirror configuration is formed, and the current $I_{load}$ to the load 18 is limited by the mirrored current $I_{d1}$.

Figure 7:
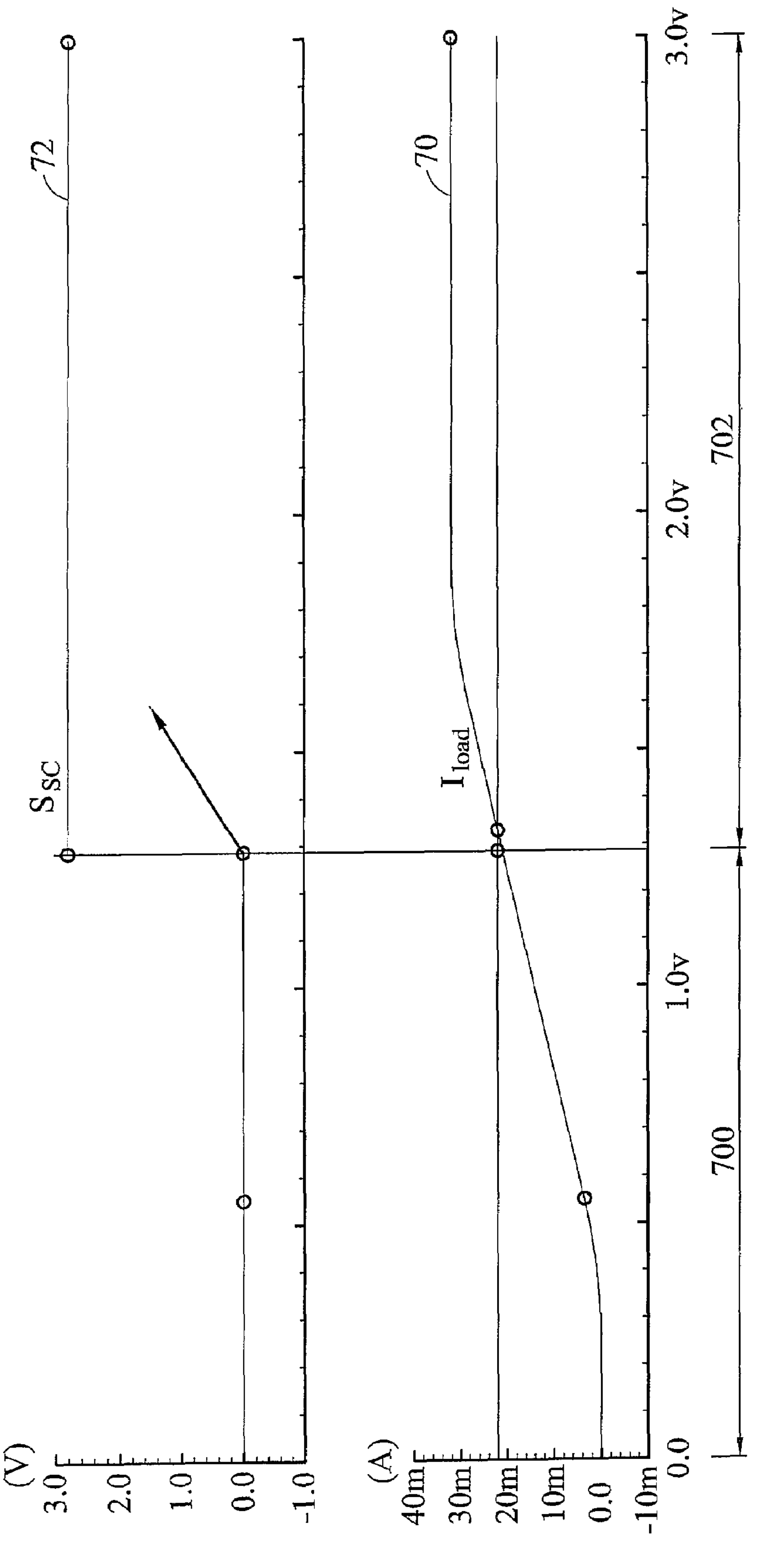
FIG. 7 is a timing diagram of short-circuit signal $S_{SC}$ and current $I_{load}$, incorporating the current limiter in FIG. 1.
Figure 8:
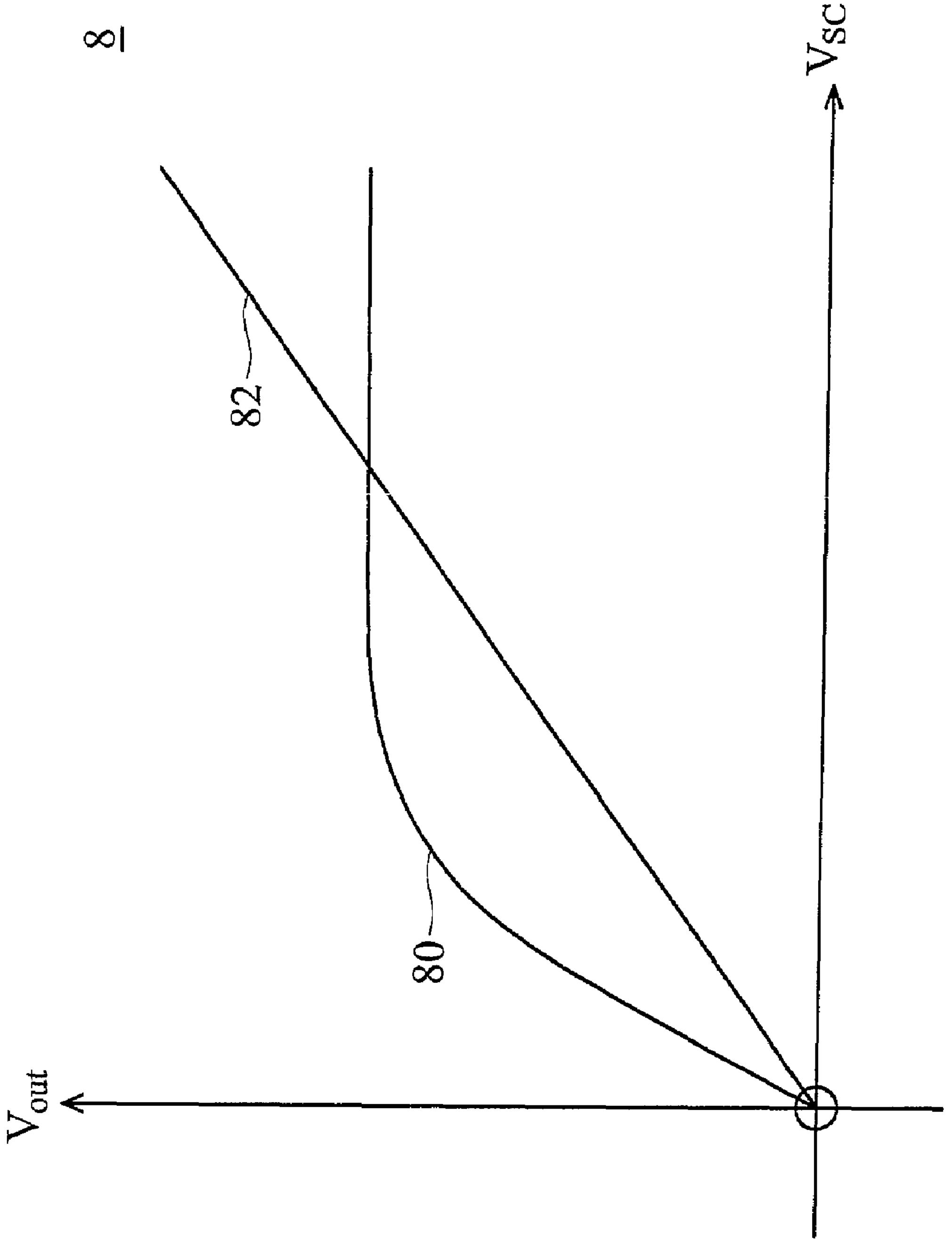
FIG. 8 shows a relationship of output voltage $V_{out}$ with respect to supply voltage $V_{SC}$ for the conventional voltage regulator and a desirable current limiter.

FIG. 7 shows a timing diagram of the short-circuit signal $S_{SC}$ and the current $I_{load}$, incorporating the current limiter in FIG. 1. There are a current $I_{load}$ 70, a short-circuit signal $S_{SC}$ 72, and durations 700 and 702. In one embodiment, the predetermined threshold current $I_{lim}$ is 20 mA, and the mirrored current is 30 mA. As a value of the load 18 decreases, the current $I_{load}$ 70 increases steadily in the duration 700 until the predetermined threshold current $I_{lim}$ (20 mA) being reached, and then the current mirror 142 is initiated. The determination circuit 12 generates the short-circuit signal $S_{SC}$ to the current mirror 142 when the current $i_{load}$ meets the predetermined threshold current $I_{lim}$, and consequently, the current mirror 142 generates the mirrored current at 30 mA through the duration 702. Thereby a current limiting functionality is provided.

A method of limiting a current through a load is also disclosed, incorporating the current limiter 4 in FIG. 4. The method includes the following steps: providing a current indication $S_I$ indicating the current $I_{load}$, generating the short circuit signal $S_{SC}$ when the current $I_{load}$ exceeding the predetermined threshold current $I_{lim}$, delivering the limited current $I_{d1}$ though the current limiting path 142 in the current supply circuit 44 to the load 18 upon reception of the short circuit signal $S_{SC}$, and passing the current $I_{load}$ from the voltage source 16 through a pass-though path in the current supply circuit 44 to the load 18 in the absence of the short-circuit signal $S_{SC}$.

The method may further include a step of producing the disable signal $S_{dis}$ from the circuit enabling signals by the determination circuit 42 to the disable current mirror circuit 142.

The step of generating the short circuit signal $S_{SC}$ may include the following steps: the reference current generator 120 generating the reference current $I_{ref}$, the series resistor $R_{Short}$ receiving the reference current $I_{ref}$ to establish the short circuit threshold voltage $V_{short}$, comparing the voltage $V_2$ with the short circuit threshold voltage $V_{short}$, and generating the short-circuit signal $S_{SC}$ when the voltage $V_2$ exceeds the short circuit threshold voltage $V_{short}$, representing the current $I_{load}$ exceeds the predetermined threshold current $I_{lim}$.

The method may further include a step for stopping the short-circuit signal $S_{SC}$ from the determination circuit 42 when the voltage $V_2$ is less than a second threshold voltage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system limiting a current through a load, comprising:

a current sensor coupled to the load, producing a current indication indicating the value of the current through the load;

a determination circuit coupled to the current sensor, generating a short-circuit signal when the current value exceeds a predetermined threshold; and a current supply circuit coupled to a voltage supply source, the current sensor, and the determination circuit, comprising a current limiting path and a current pass-through path, wherein the determination circuit determines whether the short-circuit signal is generated; if yes, the current supply circuit delivers a limited current through the current limiting path to the load upon receiving the short-circuit signal, and if not, the current supply circuit passes the current from the voltage supply source through the pass-through path to the load;

wherein the current supply circuit comprises:

a current source producing a bias current;

a first transistor in a diode connection, coupled to the current source;

a second transistor coupled to the voltage supply source and the current sensor, connected with the first transistor to form a current mirror and generate a mirrored current, and disconnected from the first transistor to provide the pass-through path;

a first switch coupled to the determination circuit, the first and the second transistors, receiving the short circuit signal to connect the first and the second transistors; and a second switch coupled to the determination circuit, a ground and the second transistor, receiving the short-circuit signal to disconnect the second transistor from the ground; and wherein the limited load current is determined by width to length (W/L) ratio of the first and the second transistors, and the bias current.

2. The system of claim 1, wherein the determination circuit and the current supply circuit are located in an integrated circuit (IC), and the current sensor is a resistor external to the IC.

3. The system of claim 1, wherein the determination circuit, the current supply circuit, and the current sensor are in an integrated circuit (IC), and the current sensor is a resistor.

4. The system of claim 1, wherein the determination circuit receives the circuit enable/disable signal and produces a disable signal disabling the current supply circuit and the current supply circuit further comprises:

a third switch coupled to the determination circuit, the voltage source and the second transistor, receiving the disable signal to connect a second gate of the second transistor to the voltage source; and a fourth switch coupled to the determination circuit, the second transistor, and the first and the second switches, receiving the disable signal to disconnect the second gate from the first and the second switches.

5. The system of claim 4, wherein the current supply circuit further comprises:

a fifth switch coupled to the first transistor, receiving the short circuit signal to disconnect a first gate and a first drain of the first transistor; and a sixth switch coupled to the first transistor and the voltage source, receiving the short-circuit signal to connect the first gate of the first transistor and the voltage source.

6. The system of claim 1, wherein the current indication comprises a first voltage and a comparison voltage at first and second ends of the current sensor, and the determination circuit comprises:

a reference current generator generating a reference current, comprising:

an operational amplifier (OP) coupled to a reference voltage, having inverting and non-inverting inputs, and an output, wherein the non-inverting input is coupled to the reference voltage;

a third transistor coupled to the OP, having a third gate, a third source and a third drain, wherein the third source is coupled to the inverting input, and the gate is coupled to the output of the OP to generate the reference current; and a reference resistor coupled to the OP and the third transistor;

a series resistor coupled to the voltage supply, current sensor resistor, reference current generator, receiving the reference current to establish short circuit threshold voltage that is relative to the voltage supply;

a comparator coupled to the short circuit threshold voltage and a second end of the current sensor having the real load supply voltage, comparing the load voltage with the short circuit threshold voltage, and generating the short-circuit signal when the load voltage exceeds the short circuit threshold voltage, indicating the current has exceeded the predetermined threshold current.

7. The system of claim 6, wherein the comparator is a Schmitt trigger, generating the short circuit signal when the load voltage exceeds the short circuit threshold voltage, and stopping the short circuit signal when the comparison voltage is less than a second threshold voltage.

8. An integrated circuit, comprising:

a determination circuit, generating a short-circuit signal when the current value exceeds a predetermined threshold; and a current supply circuit coupled to a voltage supply source, the current sensor, and the determination circuit, comprising a current limiting path and a current pass-through path, wherein the determination circuit determines whether the short-circuit signal is generated; if yes, the current supply circuit delivers a limited current through the current limiting path to the load upon receiving the short-circuit signal, and if not, the current supply circuit passes the current from the voltage supply source through the pass-through path to the load;

wherein the current supply circuit comprises:

a current source producing a bias current;

a first transistor in a diode connection, coupled to the current source;

a second transistor coupled to the voltage source and the current sensor, connected with the first transistor to form a current mirror and generate a mirrored current, and disconnected from the first transistor to provide the pass-though path;

a first switch coupled to the determination circuit, the first and the second transistors, receiving the short circuit signal to connect the first and the second transistors; and a second switch coupled to the determination circuit, a ground and the second transistor, receiving the short-circuit signal to disconnect the second transistor from the ground; and wherein the limited load current is determined by width to length (W/L) ratio of the first and the second transistors, and the bias current.

9. The integrated circuit of claim 8, further comprising a current sensor coupled to the determination circuit, outputting the current indication.

10. The integrated circuit of claim 9, wherein the current sensor is a resistor.

11. The integrated circuit of claim 8, wherein the determination circuit receives the circuit enable/disable signal and further produces a disable signal for disabling the current supply circuit and an enable signal for enabling the current supply circuit, the current mirror is a MOSFET current mirror, and the current supply circuit further comprises:

a third switch coupled to the determination circuit, the voltage source and the second transistor, receiving the disable signal to connect a gate of the second transistor to the voltage source; and a fourth switch coupled to the determination circuit, the second transistor, and the first and the second switches, receiving the enable signal to connect the gate of the second transistor to the first and the second switches.

12. The integrated circuit of claim 11, wherein the current supply circuit further comprises:

a fifth switch coupled to the first transistor, receiving the short-circuit signal to disconnect a first gate and a first drain of the first transistor; and a sixth switch coupled to the first transistor and the voltage source, receiving the short-circuit signal to connect the first gate and the voltage source.

13. The integrated circuit of claim 8, wherein the current indication comprises a first voltage and a comparison voltage at first and second ends of the current sensor, and the determination circuit comprises:

a reference current generator generating a reference current, comprising:

an operational amplifier (OP) coupled to a reference voltage, having inverting and non-inverting inputs, and an output, wherein the non-inverting input is coupled to the reference voltage;

a third transistor coupled to the OP, having a third gate, a third source and a third drain, wherein the third source is coupled to the inverting input, the gate is coupled to the output of the OP to generate the reference current; and a reference resistor coupled to the OP and the third transistor;

a series resistor coupled to the voltage supply, current sensor resistor, reference current generator, receiving the reference current to establish short circuit threshold voltage that is relative to the voltage supply;

a comparator coupled to the short circuit threshold voltage and a second end of the current sensor having the real load supply voltage, comparing the load voltage with the short circuit threshold voltage, and generating the short-circuit signal when the load voltage exceeds the short circuit threshold voltage, indicating the current has exceeded the predetermined threshold current.

14. The integrated circuit of claim 13, wherein the comparator is a Schmitt trigger, generating the short-circuit signal when the load voltage exceeds the short circuit threshold voltage, and stopping the short-circuit signal when the comparison voltage is less than a second threshold voltage.

15. A method of limiting a current through a load, comprising the steps of:

providing a current indication indicating the value of the current through the load;

generating a short-circuit signal when the current value exceeds a predetermined threshold;

determining whether the short-circuit signal is generated;

if yes, delivering a limited current through a current limiting path in a current supply circuit to the load, upon reception of the short-circuit signal; and if not, passing the current from a voltage source through a pass-though path in the current supply circuit to the load;

wherein the current supply circuit comprises:

a current source producing a bias current;

a first transistor in a diode connection, coupled to the current source;

a second transistor coupled to the voltage source and the current sensor, connected with the first transistor to form a current mirror and generate a mirrored current, and disconnected from the first transistor to provide the pass-through path;

a first switch coupled to the determination circuit, the first and the second transistors, receiving the short-circuit signal to connect the first and the second transistors; and a second switch coupled to the determination circuit, a ground and the second transistor, receiving the short-circuit signal to disconnect the second transistor from the ground; and wherein the limited load current is determined by width to length (W/L) ratio of the first and the second transistors, and the bias current.

16. The method of claim 15, further comprising a step for producing a disable signal for disabling the current mirror circuit, and the current supply circuit further comprises:

a third switch coupled to the voltage source and the second transistor, receiving the disable signal to connect a second gate of the second transistor to the voltage source; and a fourth switch coupled to the second transistor, and the first and the second switches, receiving the disable signal to disconnect the second gate from the first and the second switches.

17. The method of claim 16, wherein the current indication comprises a first voltage and a comparison voltage at a first and a second end of the current sensor, and the step of generating the short circuit signal comprises the steps of:

generating a reference current;

receiving the reference current to establish a first threshold voltage;

comparing the comparison voltage with the first threshold voltage; and generating the short-circuit signal when the comparison voltage exceeds the first threshold voltage, indicating the current exceeds the predetermined threshold.

18. The method of claim 17, further comprising a step for stopping the short-circuit signal when the comparison voltage is less than a second threshold voltage.

* * * * *